United States Patent [19]
McGee

[11] 3,745,692
[45] July 17, 1973

[54] FISHING DEVICE
[76] Inventor: Sidney McGee, 414 Hanly, Mexico, Mo. 65265
[22] Filed: May 13, 1971
[21] Appl. No.: 143,090

[52] U.S. Cl............... 43/17.5, 43/21.2, 43/42.74
[51] Int. Cl....................... A01k 93/00, A01k 97/10
[58] Field of Search................. 43/17.5, 21.2, 17, 43/44.5, 27.4, 6.5, 43.12, 54.5, 42.74

[56] References Cited
UNITED STATES PATENTS
| 952,812 | 3/1910 | Jorgensen | 43/21.2 |
| 2,527,956 | 10/1950 | Peevey | 43/17.5 |
| 2,181,458 | 11/1939 | La Gue | 43/17 |
| 3,603,019 | 9/1971 | Smeltzer | 43/21.2 |

Primary Examiner—Warner H. Camp
Attorney—Gravely, Lieder & Woodruff

[57] ABSTRACT

A fishing device includes a float having a circular sidewall provided with sockets into which fishing poles are inserted. The sockets are oriented such that the poles project outwardly and upwardly from the float, and when the float is in the water the poles are disposed above the water surface. Fishing lines depend from the outer ends of the poles and enter the water where they are attached to hooks. The float carries a light for marking the location of the fishing device in darkness.

6 Claims, 3 Drawing Figures

PATENTED JUL 17 1973 3,745,692

INVENTOR:
SIDNEY McGEE
BY Gravely, Lieder, & Woodruff
ATTORNEYS.

FISHING DEVICE

BACKGROUND OF THE INVENTION

This invention relates in general to fishing equipment and, more particularly, to a fishing device which can be left unattended in a body of water for catching fish therein.

When fishing for some species of fish it is desirable to do so away from the shore or bank of the body of water in which they live. While a boat affords access to the center of the body of water, fishing from a boat is not always desirable. In the first place, fishing from a boat requires one's presence at the area being fished. Secondly, only one area can be fished at a time. Third, the boat must be provided with some means of propulsion which usually scares the fish away.

SUMMARY OF THE INVENTION

One of the principal objects of the present invention is to provide a device for enabling one to fish a body of water away from the bank or shore thereof without being present at the location being fished. Another object is to provide a device of the type stated which is easily located at night. A further object is to provide a device of the type stated which holds multiple poles above the water so that several lines and hooks are in the water at the same time. Still another object is to provide a device of the type stated which is simple and durable in construction and easy to manufacture. These and other objects and advantages will become apparent hereinafter.

The present invention is embodied in a float having sockets thereon for receiving the ends of fishing poles. Fishing lines depend from the poles. The invention also consists in the parts and in the arrangements and combinations of parts hereinafter described and claimed.

DESCRIPTION OF THE DRAWINGS

In the accompanying drawings which form part of the specification and wherein like numerals refer to like parts wherever they occur.

DETAILED DESCRIPTION

Figure 1:
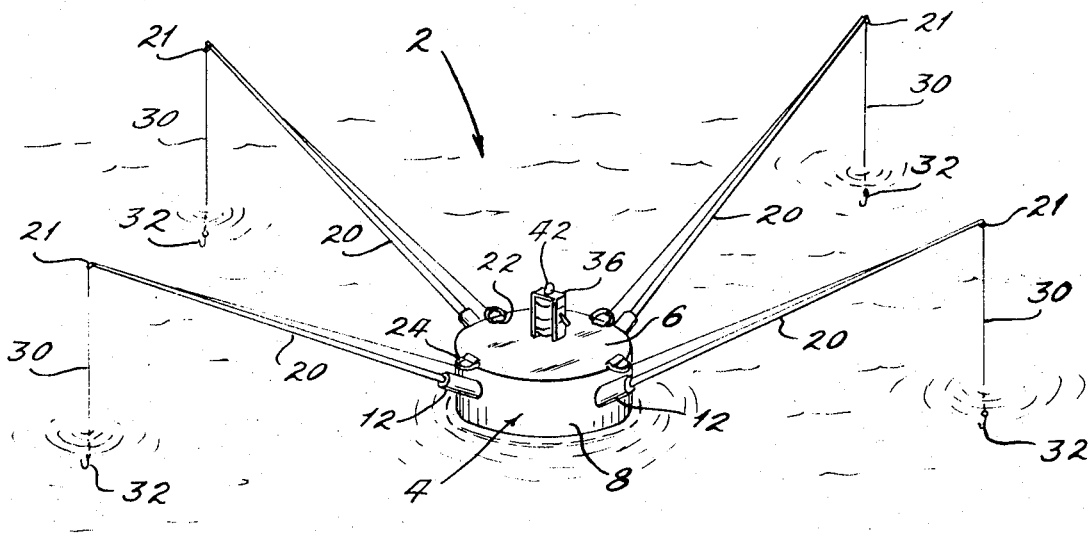
FIG. 1 is a perspective view of the fishing device floating in a body of water.

Referring now to the drawings, 2 designates a fishing device including a hollow drum 4 having circular top and bottom walls 6 and 8 and a cylindrical sidewall 10 extending between the top and bottom walls. The top wall 6 is actually a circular plate, as is the bottom wall 8, while the sidewall 10 is preferably formed from a sheet material rolled or otherwise formed into a cylindrical shape. Thus, the drum 4 has a hollow interior. Moreover, the circular upper and lower edges of the cylindrical sidewall 10 are attached to the top wall 6 and bottom wall 8 such that the drum 2 is sealed at those upper and lower edges and will float. Moreover, the drum 2 is stable when placed in water and consequently will float with the top wall 6 presented upwardly.

The sidewall 10 further has a plurality of mounting sleeves 12 fastened rigidly to it at equally spaced intervals, and these sleeves 12 project outwardly from the sidewall 10 and are canted slightly upwardly with respect thereto. In oher words, the axes of the sleeves 12 intersect the center axis of the sidewall 10, but are disposed at an oblique angle with respect thereto. The inner ends of the sleeves 12 are closed by the sidewall 10, whereas the outer ends are open. Consequently, the sleeves 12 form outwardly opening sockets around the periphery of the drum 4.

Figure 2:
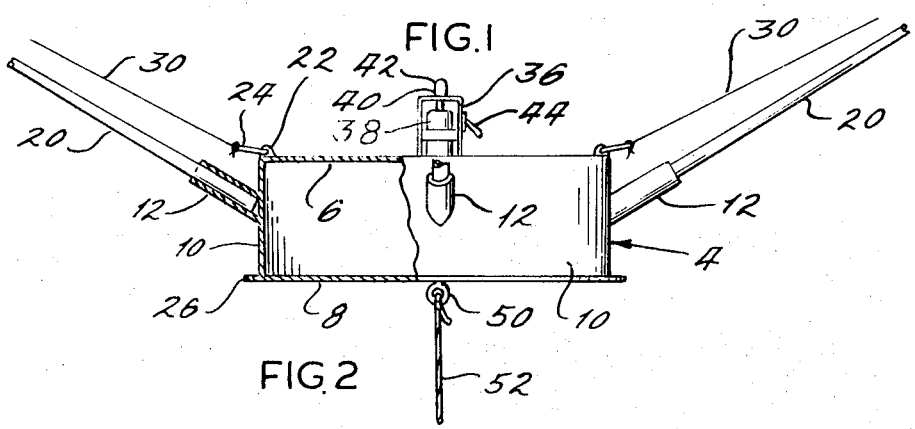
FIG. 2 is an elevational view, partially broken away and in section, of the fishing device.

The sleeves 12 in turn support fishing poles 20 (FIGS. 1 and 2) which project away from the drum 4 in the same direction as their respective sleeve axes are oriented, that is outwardly and upwardly. In particular, the outwardly opening sockets formed by the sleeves 12 snugly receive the inner ends of the poles 20 so that the poles 20 are cantilevered from the drum 4. The poles 20 at their outer ends have ferrules provided with eyes 21 (FIG. 1).

Directly above each sleeve 12 the top wall 6 has a bracket 22 fastened to it, and each bracket 22 retains a D-shaped ring 24 in such a manner that the ring 24 cannot be withdrawn from the top wall 6, but is free to pivot relative thereto.

The inner end of a fishing line 30 is tied to each D-shaped ring 24. Each fishing line 30 furthermore extends through the eye 21 at the outer end of the pole 20 projecting from the sleeve 12 located beneath the D-ring 24 to which that line 30 is tied. Thus, the lines 30 are supported intermediate their ends by the outer ends of the poles 20 beyond the outer ends of the poles 20, the fishing lines 30 depend downwardly into the water and at their ends they have hooks 32 (FIG. 1) tied to them. Normally, the lines 30 are adjusted at the D-rings 24 so that the hooks 32 are located immediately below the surface of the water when the drum 4 is allowed to float freely in the water.

Figure 3:
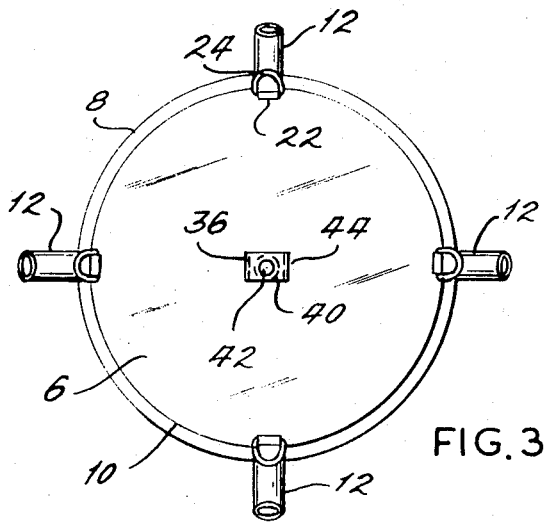
FIG. 3 is a top view of the fishing device without its poles.

Fastened to the top wall 6 at the center thereof is a battery case 36 which houses conventional dry battery 38. At its upper end the battery case 36 has a socket 40 (FIGS. 2 and 3) through which one terminal of the battery 38 is exposed. Threaded into the socket 40 is a bulb 42 having a center contact which engages the foregoing terminal of the battery 38. The other terminal of the battery 38 is connected to a switch 44 which in one position connects that other battery terminal to the battery case 36 to energize the bulb 42 and in the other position isolates that battery terminal from the case 36 so that the bulb 42 is not illuminated.

The bottom wall 8 of the drum 4 has a ring 50 (FIG. 2) attached to it for securing an anchor rope 52 to the fishing device 2. The bottom wall 8 also projects beyond the sidewall 10, forming an annular flange 26 around the lower end of the drum 4.

The fishing device 2 is normally stored in a broken-down condition in which the poles 20 are removed from the mounting sleeves 12 and stored side-by-side. Similarly, the fishing lines 30 are normally detached from the D-rings 24 when the fishing device 2 is in its broken-down condition.

The fishing device 2 is erected by inserting the inner ends of the poles 20 in the outwardly and upwardly opening sockets formed by the mounting sleeves 12. Then the fishing lines 30 are looped over the outer ends of the poles 20 and are adjusted so that the desired amount of line 30 depends from the outer end of the pole 20. Thereafter, the inner end of each line 30 is tied to its respective D-ring Once the fishing device 2 is erected, it is carried to a selected fishing area within a body of water by use of a boat. When the selected fishing area is reached, the fishing device 2 is placed in the water with its bottom wall 8 presented downwardly. Since the drum 4 is hollow it will float in the water such that the poles 20 extend outwardly and upwardly above the surface of the water. Should the body of water possess a current, the ring 50 on the bottom of the drum 4 should be attached to an anchor rope so that the fishing device is not carried away from the selected fishing area by the current. On the other hand, if the body of water is placid, the fishing device 2 need not be anchored to keep it in the same location. If the user plans to fish at night or recover the fishing device 2 in darkness, the switch 44 should be moved to its on position, in which case the bulb 42 will be energized and will mark the location of the fishing device 2 in the darkness.

In use the drum 4 of the fishing device 2 floats in the water and supports the fishing poles 20 in a canted position relative to the surface of the water (FIG. 1). The fishing lines 30 depend from the outer ends of the poles 20, and enter the water so that the fish hooks 32 are presented below the surface of the water and are spaced a sufficient distance apart to avoid entanglement with each other. The flange 26 helps stabilize the drum.

This invention is intended to cover all changes and modifications of the example of the invention herein chosen for purposes of the disclosure which do not constitute departures from the spirit and scope of the invention.

What is claimed is:

1. A fishing device comprising a float capable of floating in water and having a circular sidewall which is oriented such that its center axis is presented vertically when the float is floating in water; substantially cylindrical sockets on the float and opening outwardly therefrom, the center axes of the sockets intersecting the center axis of the circular sidewall and being presented at an oblique angle with respect thereto; poles inserted into the sockets and extending away therefrom, the outer ends of the poles being presented above the surface of the water; and fishing lines supported by the outer ends of the poles and depending therefrom into the water.

2. A fishing device according to claim 1 and further characterized by illuminating means carried by the float for marking the location of the fishing device in darkness.

3. A fishing device comprising: a float capable of floating in water and including a circular sidewall which is oriented with its axis presented vertically when the float is floating in water, the float also including a top wall which is sealed to the top edge of the sidewall; sockets mounted on the sidewall and opening outwardly therefrom; rings attached to the top wall above the sockets on the sidewall; poles inserted into the sockets and extending away therefrom, the outer ends of the poles being presented above the surface of the water; and fishing lines supported by the outer ends of the poles and depending therefrom into the water, the fishing lines being tied to the rings.

4. A fishing device comprising a drum-like float which floats in water and has a top wall, a bottom wall, and a peripheral sidewall sealed to the top and bottom walls such that the interior of the float is water tight; a plurality of sockets mounted on the sidewall below the top wall and opening outwardly therefrom in different directions, the axes of the sockets extending outwardly and also upwardly at an oblique angle with respect to the horizontal; and poles inserted into the sockets and extending outwardly and upwardly from the float for suspending fishing lines therefrom and into the water.

5. A fishing device according to claim 4 and further characterized by rings attached to the top wall of the float for securing the ends of the lines.

6. A fishing device according to claim 4 and further characterized by a battery case carried by the top wall, a battery in the battery case, a socket in the battery case, and a bulb in the socket and electrically connected to the battery, whereby the bulb will mark the location of the fishing device at night.

* * * * *